United States Patent [19]

Einstein

[11] 4,211,833
[45] Jul. 8, 1980

[54] BIPOLAR BATTERY

[75] Inventor: Harry Einstein, Springfield, N.J.

[73] Assignee: Exxon Research & Engineering Co., Florham Park, N.J.

[21] Appl. No.: 967,625

[22] Filed: Dec. 8, 1978

[51] Int. Cl.² .................. H01M 6/48; H01M 4/02
[52] U.S. Cl. .......................... 429/149; 429/152; 429/185; 429/210
[58] Field of Search ............... 429/210, 152, 160, 162, 429/149

[56] References Cited

U.S. PATENT DOCUMENTS

| 627,009 | 6/1899 | Paget | 429/210 X |
|---|---|---|---|
| 762,715 | 6/1904 | Haschke | 429/210 X |
| 2,519,053 | 8/1950 | Reinhardt | 429/162 X |
| 3,108,908 | 10/1963 | Krebs | 429/162 X |
| 3,723,181 | 3/1973 | Oakley | 429/210 X |
| 3,728,158 | 4/1973 | Poe et al. | 429/210 X |
| 3,784,410 | 1/1974 | Bergum et al. | 429/210 X |
| 3,795,543 | 3/1974 | Poe | 429/160 X |
| 3,817,788 | 6/1974 | Eckerbom et al. | 429/210 X |
| 3,841,914 | 10/1974 | Boyle et al. | 429/162 X |

FOREIGN PATENT DOCUMENTS 636212  2/1962  Canada .
225407  12/1924  United Kingdom .

Primary Examiner—Skapars, Anthony
Attorney, Agent, or Firm—David A. Jackson; Kenneth P. Glynn

[57] ABSTRACT

A bipolar battery is provided which comprises at least two battery cells, said battery cells each comprising a plurality of electrodes, said electrodes comprising at least two cellular end plate electrodes and at least two interstitially located single pole electrodes, a continuous, sheet-like insulator located in alternating, woven disposition within each of said cells between all adjacent electrodes to provide electrical separation thereof, wherein the end plate electrodes of adjacent cells are of opposite polarity and comprise a single, bipolar electrode, and all of said electrodes are adapted to conduct current internally between each other and said cells.

23 Claims, 6 Drawing Figures

BIPOLAR BATTERY

BACKGROUND OF THE INVENTION

(1) Field of the Invention

The present invention relates to batteries, and more particularly to such batteries as employ bipolar electrodes.

(2) Description of the Prior Art

The employment of bipolar electrodes has been known for some time. Thus, for example, U.S. Pat. No. 627,009 to Paget discloses a storage battery of the lead-acid type which is characterized by the employment of bipolar electrodes. Further more recent interest has been generated in the employment of bipolar electrodes in storage batteries as evidenced by U.S. Pat. Nos. 3,795,543 to Poe, 3,728,158 to Poe et al, 3,817,788 to Eckerbom et al and others. Applicant has noted, however, that the batteries employing bipolar electrodes presently known in the art have not been capable of providing a sufficiently high power density without the employment of relatively thin electrodes of large surface area. The provision of electrodes of large area would require a substantial support structure which would add excess weight to the resulting battery. Further, the relatively small dimension between the cells characteristic of such a battery in the context of the large surface area of the electrodes would result in a battery having a height and width disproportionately large in relation to its length and which would render such a battery spatially unsuitable for certain applications.

The employment of bipolar electrodes in batteries of varying dimension and configuration is likewise illustrated in the prior art. Thus, U.S. Pat. No. 762,715 to Haschke discloses the employment of bipolar electrodes as cell separators in a multiple-cell battery wherein the individual cells are provided with single pole electrodes electrically connected to the respective like pole of the bipolar cell separator element. The Haschke invention which is disclosed as having application to reversible galvanic batteries, and/or primary batteries, is, however, deficient in the cumbersome nature of the construction engendered by the employment of external electrical connections or leads provided between the respective electrodes or plates.

U.S. Pat. No. 2,519,053 to Reinhardt, relating to flat batteries, discloses the construction of a battery comprising a continuous strip of electrodes which are folded on themselves and positioned to be in juxtaposition to each other, wherein the continuous strip comprises a separator for the respective electrodes. Reinhardt, however, does not remedy the deficiency of inadequate power density characteristic of prior art bipolar electrode construction.

U.S. Pat. No. 3,841,914 to Boyle et al relates to a solid state battery comprising a plurality of stacked cylindrical cells, noteworthy in the employment of an electrical connection for each of the positive and negative poles achieved by the employment of an alternating conducting strip which passes between the respective electrodes in alternating, folding fashion. Boyle, however, does not relate to the employment of bipolar electrodes in batteries. In a similar manner to Boyle et al, U.S. Pat. No. 3,108,908 to Krebs relates to a hermetically sealed storage battery which employs oppositely charged electrodes in alternating disposition with oppositely directed electrical connectors providing electrical connection between electrodes of like charge. Also, the electrodes are separated by a continuous material which weaves between the respective electrodes. Krebs, however, also fails to disclose the employment of bipolar electrodes in batteries.

In addition to the disclosures discussed above, other patents are known that are believed relevant to the state of the art. Thus, Canadian Pat. No. 636,212 to Nelson discloses that a plurality of bipolar electrodes may be fabricated in continuous strip-like fashion and then alternately folded or stacked. British Pat. No. 225,407 to Weissman illustrates a battery employing a continuous, folding negative electrode which alternates to contain a plurality of negative electrode units. U.S. Pat. No. 3,723,181 to Oakley discloses the preparation of individual bipolar electrode units by a method comprising the deposition of the electrically active material on both sides of a continuous, non-conductive strip, whereby deposition of the specific electrode material is placed over an initial deposition of conductive material connecting the respective sides of the strip. Likewise, U.S. Pat. No. 3,784,410 to Bergum et al discloses the production of bipolar electrodes by deposition of the active material upon a continuous metal strip having two non-reactive metal sides. All of the foregoing patents relate to aspects of battery technology, however none deal with the problem of efficiently increasing the power density obtainable from bipolar electrodes in battery construction.

SUMMARY OF THE INVENTION

In accordance with the present invention, a bipolar battery is provided which comprises at least two battery cells, said battery cells each comprising a plurality of electrodes, said electrodes comprising at least two cellular end plate electrodes and at least two interstitially located single pole electrodes, said end plate electrodes and said single pole electrodes each provided in equal numbers of opposite charge and in alternate disposition based on said charge, a continuous, sheet-like insulator located in alternating, woven disposition within each of said cells between all adjacent electrodes, to provide electrical separation thereof wherein the end plate electrodes of adjacent cells are of opposite polarity and comprise a single, bipolar electrode, and all of said electrodes are adapted to conduct current internally between each other and said cells. The single pole electrodes of like charge to said end plate electrodes are disposed in alternation furthest removed therefrom and are provided with electrical connector members running laterally within said battery between like charged electrodes, said connector members running parallel adjacent the opposite lateral edges of said electrodes into engagement with the respective end plate electrodes.

The batteries of the present invention may employ bipolar electrodes, wherein each of the active surfaces has one or more single pole electrode connected to it, depending upon the end use of the battery. The present invention includes a method of assembly including the perforation of the individual electrode units. In one embodiment relating to the manufacture of lead acid batteries, the electrode may be prepared by flame spraying a coating of lead particles onto a lead foil sheet employed as the electrode support. The provision of the flame sprayed coating improves the adhesion and integrity of the subsequently applied lead oxide paste. Also, increased battery life would be attained by the employment of laminates of various metal foils as a support for the electrodes.

DETAILED DESCRIPTION OF THE PREFERRED EMBODIMENTS

The present invention relates to a bipolar battery which employs relatively thin double surfaced electrodes preassembled in groups comprising a bipolar electrode element defining active surfaces of opposite charge, and a plurality of single pole electrode elements provided in equal numbers of opposite charge respectively electrically connected to the like charged active surface of said bipolar electrode element. The battery of the present invention further comprises an end plate electrode assembly similar in construction to that of the bipolar electrode assembly, with the exception that the end plate electrode element possesses only one active surface to which single pole electrodes of like charge are provided and electrically connected. The battery of the present invention is assembled by the interleaving in alternate charge disposition of the single pole electrodes of adjacent assemblies whereby all active surfaces have juxtaposed thereto active surfaces of opposite charge. Finally, a continuous, sheet-like separator is provided in alternating woven disposition and extends from an active surface of the bipolar electrode element, between the alternating single pole electrode elements, into contact with the next adjacent active surface of either a bipolar or electrode or an end plate electrode.

The battery construction of the present invention may be employed in a wide variety of battery assemblies, including, without limitation, primary and secondary batteries, alkaline batteries, lead acid batteries and the like. More particularly, the invention may be employed with such electrode systems as nickel-zinc, nickel-cadmium, nickel-iron, silver-iron, silver-zinc and the like. The batteries of the present invention may vary in size and configuration from that of the "button" cells, to large power output storage batteries, and the invention is thus not limited in its scope and application. The ensuing description, however, will proceed with reference to a battery construction which, for purposes of illustration only, will approximate that construction useful in the manufacture of storage batteries such as those of the lead-acid type.

Figure 1:
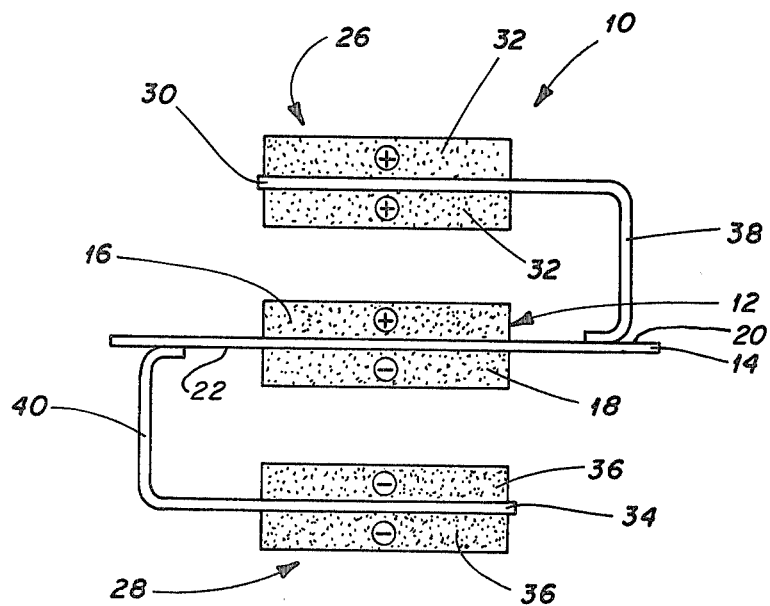
FIG. 1 is a schematic end view illustrating the bipolar electrode employed in accordance with the present invention.

Referring now to the Figures wherein like numerals designate like parts, FIG. 1 schematically illustrates a bipolar electrode as contemplated by the present invention. Referring now to FIG. 1, bipolar electrode assembly 10 may be illustrated as comprising a central bipolar electrode 12 which is comprised of a central, planar support plate 14 on both surfaces of which are deposited active material comprising, respectively, the positive active surface 16 and negative active surface 18.

In addition to bipolar electrode 12, assembly 10 includes single pole electrodes 26 and 28 which serve to augment the power density of bipolar electrode assembly 10. Thus, single pole electrode 26 comprises in the illustration a double-surfaced positive electrode similar in construction to electrode 12 in the provision of two surfaces of active materials differing however in that both of the surfaces are of like charge. Thus, electrode 26 comprises a central support plate 30 prepared from conductive material, which has located on both broad surfaces thereof positive active material 32; correspondingly, electrode 28 comprises a central support plate 34 which has deposited on both surfaces thereof negative active material 36. Electrodes 26 and 28 are electrically connected to respective support surfaces 20 and 22 by the provision of connector members 38 and 40, which may, in one embodiment, comprise sheet-like extensions of respective support plates 30 and 34.

The construction described above possesses several advantages, among them the increased power density obtainable through the bipolar electrode assembly by the augmentation of the respective secondary single pole electrodes. The construction facilitated by the use of the connector members 38 and 40 achieves the advantage that the electrical connection between the respective plates is maintained internal to the battery structure, rather than relying on well known external connections as evidenced in the prior art. The width of connector members 38 and 40 can be seen in FIG. 4 to approximate that of the support plate, as it has been found that the employment of connectors of this relative dimension greatly reduces the IR drop particularly experienced in bipolar electrode constructions, and in batteries of the high power density type. Further, as it is understood that the power density of a respective electrode is dependent upon the available surface area, the employment of the secondary electrode augmentation achieves the benefit of providing the requisite surface area within a configuration more amenable to the construction of batteries meeting conventional design and dimensional specifications.

Figure 2:
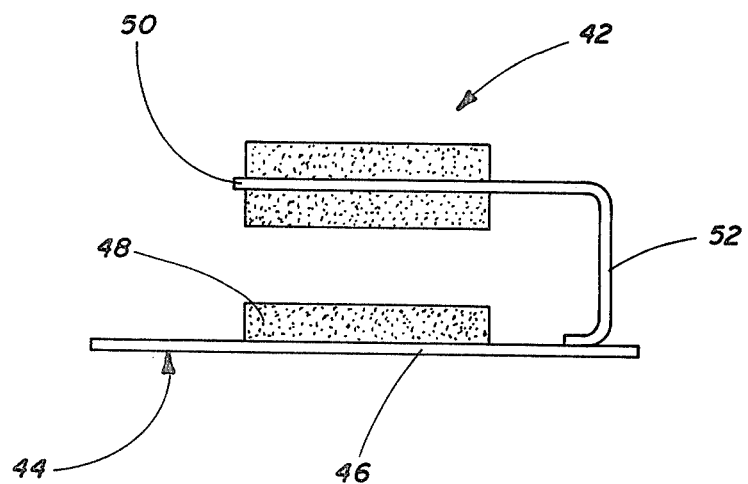
FIG. 2 is a schematic view similar to FIG. 1 illustrating the end plate electrode prepared in accordance with the present invention.

Referring now to FIG. 2, the principles of the structure of bipolar electrode assembly 10 described with respect to FIG. 1 can now be seen in application to the preparation of the remaining electrode assemblies employed in the battery of the present invention. Specifically, end plate electrode assembly 42 is shown which comprises end plate electrode 44 which comprises planar support plate 46, only one surface of which is provided with an active surface 48, likewise comprising an electrically active, charged material. As with bipolar electrode 12, end plate electrode 44 is augmented by association with single pole electrode 50, which possesses double active surfaces in the same manner as electrodes 26 and 28. Electrode 50 is connected to end plate electrode 44 by connector member 52 in the manner described with respect to connector members 38 and 40, above.

Figure 3:
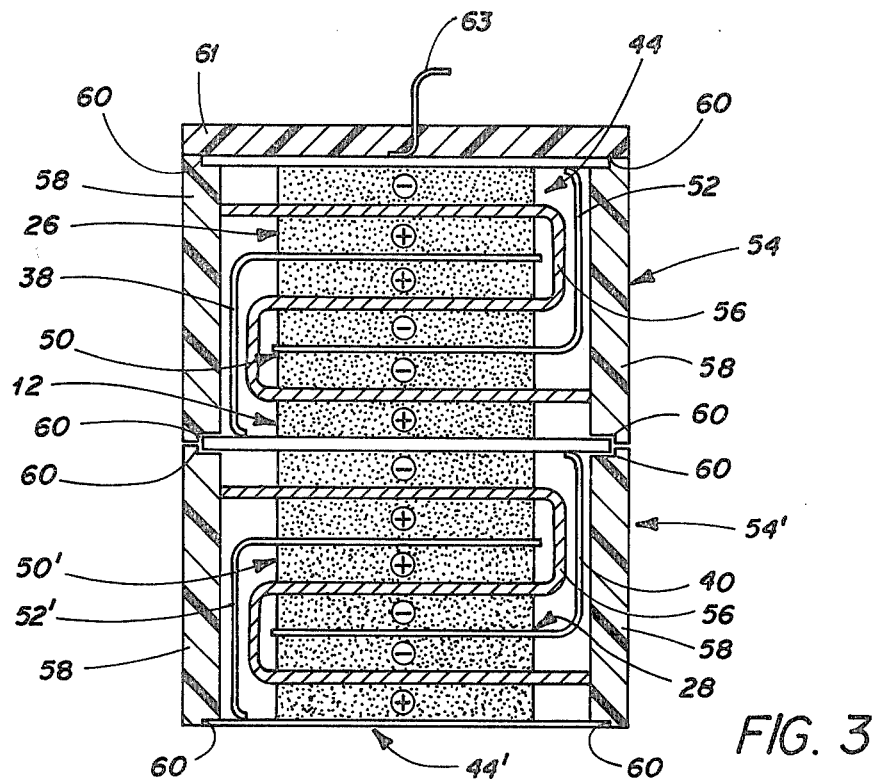
FIG. 3 is a schematic top view partly in section illustrating the cellular arrangement of the battery of the present invention.

The assembly of the battery of the present invention is illustrated in FIG. 3 wherein a two-celled assembly is schematically presented. Thus, referring to FIG. 3, battery cells labeled generally 54 and 54', respectively, can be seen to comprise an interleaving of a bipolar electrode assembly such as that illustrated in FIG. 1 with two end plate electrode assemsblies of the type illustrated in FIG. 2, the latter assemblies differing from one another only in their charge. Thus, bipolar electrode 12 is centrally provided so as to serve as a cell divider between cells 54 and 54', and is electrically connected by respective connectors 38 and 40 to single pole electrodes 26 and 28. End plate electrode assemblies 44 and 44', comprising, respectively, identical units of negative and positive charge, are displaced in distal relation to bipolar electrode 12 with their respective single pole electrodes 50 and 50' located interstitially between bipolar electrode 12 and single pole electrodes 26 and 28, respectively.

A further features of the invention comprises a provision of a continuous, sheet-like separator or insulator 56 which passes between the respective electrode surfaces in a sinuous, weaving fashion to maintain electrical separation between the electrodes and to prevent inter-electrode shorting caused by what is known as "treeing" between the surfaces of adjacent plates. As can be seen in FIG. 3, separators 56 describe an essentially S-shaped pattern in cross-section which coincides with the directions assumed by connector members 38, 40, 52 and 52'.

The employment of a continuous, sheet-like separator is particularly advantageous for use in high speed, automated manufacturing techniques, as the separator material requires less frequent handling and, by its continuous nature may assist in the assembly of the respective electrode plates into the cell. Separator 56 may be made from a wide variety of materials known in the battery art, and, for example, can include materials such as rubber, paper and other cellulosic materials, polyolefins such as polyethylene and polypropylene, polyesters, polyvinyl chloride and the like. The actual dimensions of separator 56, as well as those of the other components comprising the battery of the present invention may vary in accordance with the dimensional and power requirements contemplated in a specific utility. The scope of the invention is therefore deemed to embrace all such modifications and is not deemed limited to any particular embodiments such as those illustrated herein.

Referring further to FIG. 3, cells 54 and 54' are illustrated in a top view, and may be essentially rectangular in shape, this shape and support provided by wall-like spacers 58 which define the outer lateral walls of the cells. Spacers 58 may also provide support for electrodes 12, 44 and 44' by defining longitudinal indentations 60 within which the respective support plates can be seated. Also, end plate 61 is provided which contacts the free ends of spacers 58 as shown in FIG. 3, and serves to close off and support end plate electrode 44, as well as to assist in forming an integral container for the battery. Also, as shown in FIG. 3, lead wire 63 may, if desired, be provided which could pass through an appropriate opening in end plate 61 to facilitate electrical connection.

Figure 4:
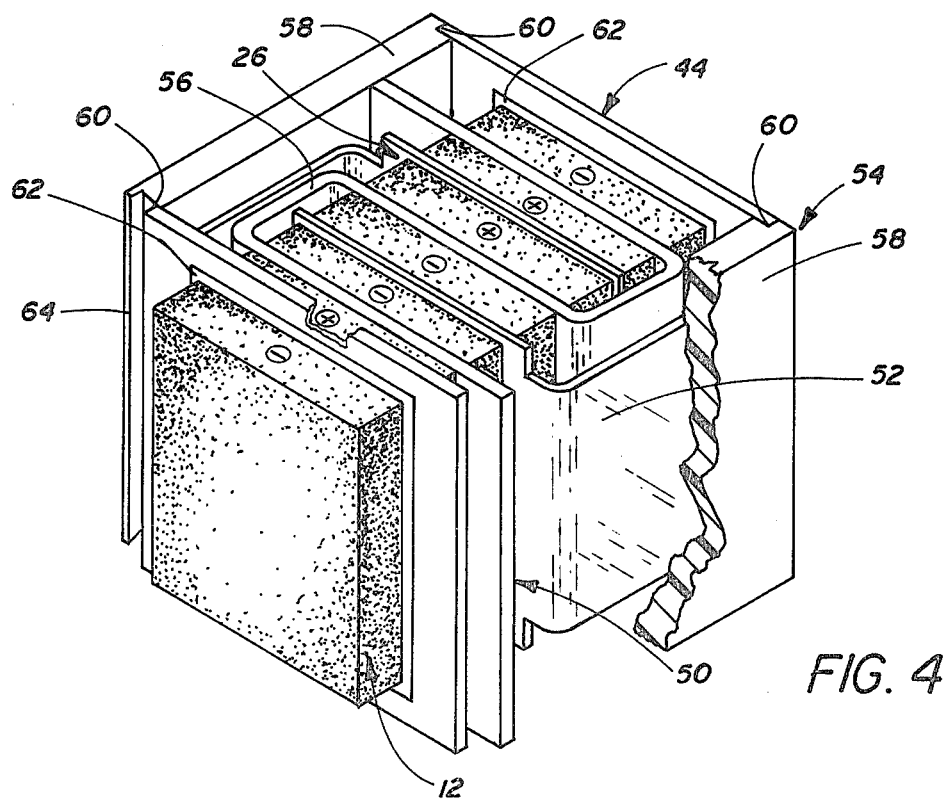
FIG. 4 is a perspective view of one cell of the battery of the present invention.

Referring further to FIGS. 3 and 4, it is important to maintain a fluid-tight seal between the adjacent cells. To this end, common bipolar electrode 12 may be provided with a peripheral coating or frame of a suitable sealant composition located along the border of the support plate. Referring to FIG. 4, a thin framework of sealant 62 is illustrated and may be applied to the separator plates of electrodes 12 and 44. Thus, upon final assembly of cell 54, a fluid-tight seal will be maintained between spacers 58 and the respective electrodes 12 and 44 which will effectively constrain the electrolyte within the cell. Sealant 62 may comprise a wide variety of fluid-impervious materials suitable in the specific environment of the particular battery under construction. In the instance where lead-acid batteries are contemplated, a suitable sealant may comprise a material such as polystyrene which adheres favorably to lead, the material from which the support plates of the battery would likely be prepared. Of course, the sealant may be formulated from other materials of similar characteristics, and the invention should not be construed as limited to the selection of a particular fluid-impervious material.

Referring further to FIGS. 3 and 4, spacers 58 and end plate 61 as illustrated are indicated to be of organic resinous material. Naturally, both spacers 58 and end plate 61 may be prepared from a wide variety of suitable materials such as battery box rubbers, and synthetic resinous materials such as polyolefins, including polyethylene, polypropylene, polystyrene and the like. Further, though not illustrated herein, sheets of such material could be provided of appropriate dimension to comprise the end walls, top and bottom of the battery, which would be assembled and bonded by conventional techniques such as heat sealing, adhesives, solvents and the like. Referring again to FIG. 4, spacer 58 in one embodiment may be provided with a tongue-in-groove configuration along the end wall 64 thereof to facilitate an interlocking with the next adjacent spacer frame, which would retain the electrodes in firm position therebetween while the appropriate sealing technique is applied.

As discussed above, each of the single pole electrodes employed in the battery of the present invention is electrically associated with either a bipolar electrode or an end plate electrode by means of connector members originating from the support plates of the respective single pole electrodes and attaching on the support plates of the respective bipolar or end plate electrode. The connector members as discussed above may be seen in one embodiment illustrated in FIG. 4 to be integral with the central support plate of the respective single pole electrode and may comprise a sheet of material traveling laterally along the lateral edges of the electrodes to make contact with the appropriate support plate. As discussed earlier, the connectors such as connector 52 may vary in width, as illustrated in FIG. 4, to within the width of the electrode support plate with which it is integral, to reduce IR or voltage drop between the electrode elements.

Referring again to FIG. 4, connector 52 travels outside separator 56 to make contact with end plate electrode assembly 44. Correspondingly, connector 38 as illustrated in FIG. 3, travels in a parallel and opposite direction on the opposing lateral side of cell 54 to make contact with the support plate of bipolar electrode 12. As noted above, the electrical contacts provided by the connectors employed in accordance with the present invention achieve the feature of obtaining internal electrical contact throughout the battery, whereby the more costly and less efficient electrical contacts achieved by external leads are eliminated. This form of electrical contact results in a battery having greater efficiency and less power loss due to the simplification of the electrical pathways located therewithin.

As noted earlier, the battery of the present invention may be manufactured in accordance with practices certain of which are well known in the battery art. Thus, in the instance where lead-acid batteries are contemplated, the electrodes of the present invention may comprise lead plates to which an expanded lead foil may be attached, said lead foil attached in the areas contemplated for application of active material for the electrode. Subsequent to the provision of the expanded lead foil, the outer surface thereof may have applied thereto a lead oxide paste which is subsequently appropriately charged. Alternatively, the expanded lead foil may itself be treated with an application of a porous lead surface by such techniques as flame spraying to facilitate improved adhesion of the lead oxide paste subsequently applied.

Lead foil could also comprise the sole support plate for the electrode and could, in accordance with the present invention, therefore have applied to both broad surfaces thereof a porous lead surface by a flame spraying technique. The provision of the flame-sprayed coating on both sides of the lead foil yields an increased acitve surface area, and improves adhesion of the subsequently applied lead oxide paste.

Figure 6:
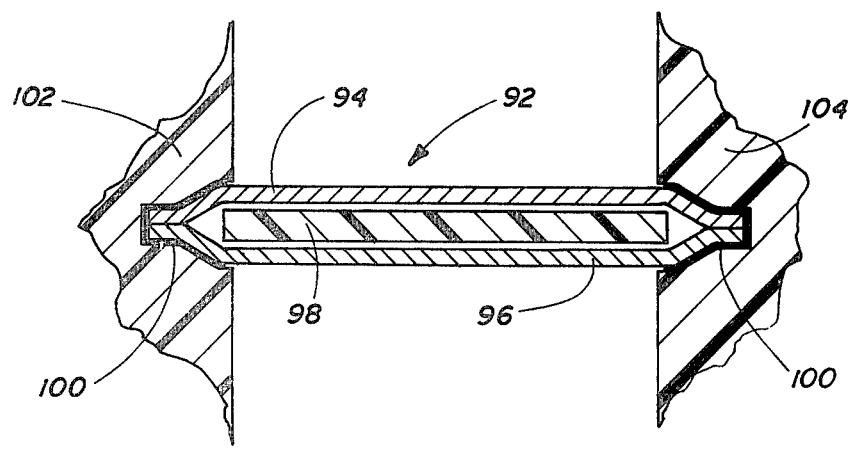
FIG. 6 is a top sectional view illustrating a composite electrode support surface useful in the present invention.

In an alternate embodiment illustrated in FIG. 6, a bipolar electrode prepared from lead foil may comprise a support structure 92 providing paired foil sheets 94 and 96 between which an insulator 98 would be provided to form a sandwich relationship therebetween. Sheets 94 and 96 would be appropriately crimped as shown and could be sealed by soldering or the like. The crimped edge could then be provided with a seal 100 traveling the entire perimeter which would provide a fluid-tight mount when support structure 92 is placed within frames such as frame members 102 and 104. This composite construction is particularly useful in the instance where lead-acid batteries are being prepared, as the lead foil comprising the electrode support is continuously attacked and etched by the fluid in the operating battery cell, and the development of even a small pin hole in such a bipolar electrode could cause battery failure. The provision of the insulator prevents the development of pin holes which results in intercellular fluid leakage and battery failure. In accordance with the present invention, the insulator may, for example, alternatively comprise a very thin double-surfaced plastic tape or an appropriate insulative coating resistant to the battery environment applied to at least one of the contiguous surfaces of the foil sheets or plates. The employment of the composite bipolar electrode system described above is therefore particularly advantageous, as batteries utilizing this construction, particularly those of the lead-acid type, exhibit long life in service.

Undividual cells 54 may be assembled by a wide variety of techniques which would all comprise the interleafing of the separator 56 with respective electrode units, the completion of electrical connection between respective electrode units to form electrode assemblies, followed by the mounting of the completed cell upon spacers 58. Prior to the assembly of the respective cells, individual electrode units may be subjected to formation in accordance with the technique known as "dry-charging." The technique of "dry-charging" is well known in the art and does not per se form a part of the present invention.

As indicated earlier, the present invention contemplates the employment of multiple electrode assemblies which are subsequently assembled into respective cells, wherein each cell contains an equal number of single pole electrodes of opposite charge. The preceding discussion has illustrated the instance where each of the bipolar electrodes and end plate electrodes have been prepared in electrode assemblies wherein the primary electrode is augmented by the attachment of at least one single pole electrode bearing a like charge thereto. Thus, it is possible that both the bipolar electrode and the end plate electrode may be augmented by a plurality of such single pole electrodes appropriately displaced and assembled in a battery cell.

Figure 5:
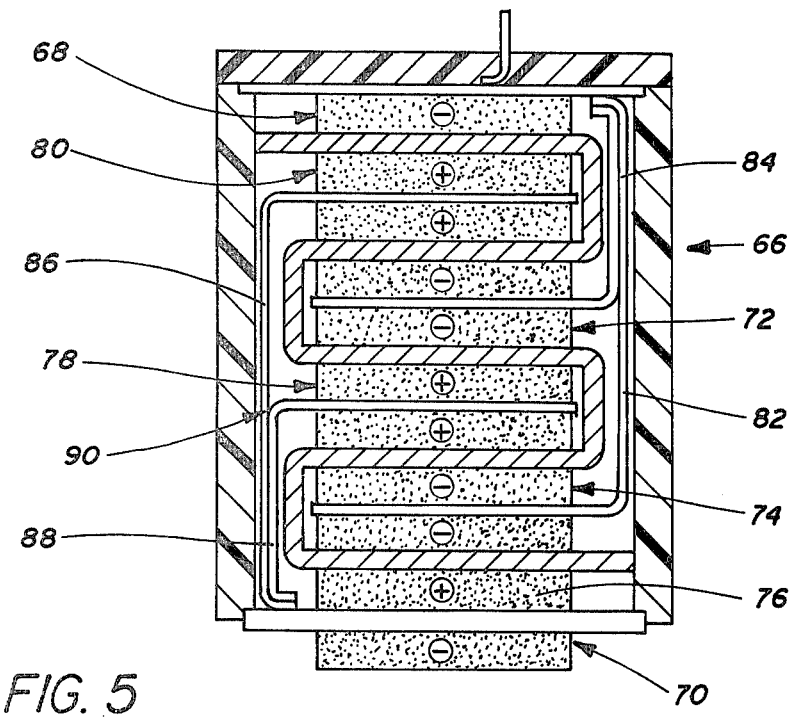
FIG. 5 is a top view partly in phantom similar to FIG. 3 illustrating an alternate embodiment of the present invention.

Referring now to FIG. 5, a variant battery cell 66 is illustrated which comprises the assembly of an end plate electrode 68 and a bipolar electrode 70, each of which have attached thereto two single pole electrodes. Specifically, end plate electrode 68 has attached thereto single pole electrodes 72 and 74 which are of like charge to end plate electrode 68 and displaced in alternate fashion in distal relationship thereto. Likewise, bipolar electrode 70 has associated with positive electrode surface 76 positively charged single pole electrodes 78 and 80. Electrical connection between the single pole electrodes and the primary electrodes is accomplished in like manner to that discussed previously by the provision of individual connector members 82 and 84, emanating from electrodes 74 and 72, and 86 and 88 emanating from electrodes 80 and 78, respectively. The connector members may individually travel to make contact with the respective primary electrodes or, alternatively, may be situated whereby, for example, connector member 86 makes contact with connector member 88 at a point labeled herein 90 and connector member 86 then continues singly to make contact with bipolar electrode 70. Naturally, this configuration is merely illustrative of a manner of connection which may be determined within the skill of the art and employed throughout the construction of the battery, and therefore the invention is believed to encompass all such modifications within its scope without restriction to any particular configuration or mode of attachment illustrated herein.

I claim:

1. A bipolar battery comprising at least two battery, cells, said battery cells each comprising a plurality of electrodes, said electrodes comprising at least two cellular end plate electrodes and at least two interstitially located single pole electrodes, said end plate electrodes and said single pole electrodes each provided in equal numbers of opposite charge and situated in alternate disposition to each other based upon said charge.

a continuous, sheet-like separator located in alternating, woven disposition within each of said cells, said separator passing between all adjacent electrodes to provide electrical separation thereof, wherein contiguous end plate electrodes of adjacent cells are of opposite polarity and comprise a single, bipolar electrode, and wherein all of said electrodes are adapted to conduct current internally between each other and said cells.

2. The battery of claim 1 wherein said single pole electrodes of like charge to said end plate electrodes are disposed in alternation furthest removed from said end plate electrodes of like charge, and are provided with electrical connector members located within said battery, said electrical connector members providing direct electrical connection between said single pole electrodes and said end plate electrodes of like charge.

3. The battery of claim 2 wherein said electrical connector members of oppositely charged single pole electrodes travel in opposite directions parallel to each other adjacent the opposite lateral edges of said electrodes into engagement with said respective like charged end plate electrodes.

4. The battery of claim 3 wherein said single pole electrodes comprise essentially planar structures, each of said electrodes defining a support plate and active material mounted on at least one braod surface thereof, and said connector members comprise sheet-like extensions integral with said support plates.

5. The battery of claim 4 wherein said single pole electrodes define active material on both broad surfaces of said support plate, and said active material is of like electrical charge.

6. The battery of claim 1 wherein said bipolar electrode comprises a planar support plate defining on the opposite broad surfaces thereof electrically equivalent quantities of active material of opposite charge, and wherein each of said broad surfaces is directly electrically connected to at least one single pole electrode of like charge thereto.

7. The battery of claim 1 further including paired, parallel spacer members, said spacer members located in transverse relationship to said electrodes at the lateral edges thereof, and said spacer members of adjacent cells adapted for bonded engagement along abutting lateral peripheral edges thereof.

8. The battery of claim 7 wherein said spacer members are provided with mechanical locking means along said abutting lateral peripheral edges.

9. The battery of claim 7 wherein said spacer members define paired indentations along the length of parallel lateral peripheral edges, said indentations adapted to seat the lateral edges of said end plate electrodes, and wherein the indentations provided along said abutting lateral peripheral edges together define a track for the locking engagement of said end plate electrodes.

10. The battery of claim 9 wherein said track retains said end plate electrodes in fluid-impervious engagement to prevent the passage of electrolyte between said cells.

11. The battery of claim 10 further including sealing means provided along the peripheral edge of said end plate electrodes, said sealing means adapted to be located interstitially between the peripheral edge of said electrode and said tracks to provide said fluid-impervious seal.

12. The battery of claim 6 wherein said planar support plate comprises a composite structure, said composite structure comprising paired, parallel metal foil sheets and a non-conductive separator located therebetween, wherein said support plates reside in bonded contact with each other along the perimeters thereof and said electrode is characterized by increased life in operation within said battery.

13. The battery of claim 12 wherein said non-conductive separator comprises a double-surfaced plastic tape.

14. The battery of claim 12 wherein said non-conductive separator comprises an insulative coating applied to at least one of the contiguous surfaces of said foil sheets.

15. The battery of claim 13 wherein said metal foil sheets are prepared from lead.

16. A bipolar electrode for use in a battery construction which comprises a planar support plate defining on the opposite broad surfaces thereof electrically equivalent quantities of active material of opposite charge, and wherein each of said broads surfaces is directly electrically connected to at least one single pole electrode of like charge thereto.

17. The electrode of claim 16 wherein said single pole electrode comprises a central support plate defining broad planar surfaces of like charge, and a quantity of active material located on each of said broad surfaces.

18. The electrode of claim 16 wherein two single pole electrodes of like charge are attached to each of said broad surfaces of said bipolar electrode.

19. The electrode of claim 16 further including means for providing direct electrical connection between said broad surfaces and said respective single pole electrodes, said electrical connection means comprising a sheet-like extension of the support plate of said single pole electrodes, said extension adapted at the free end thereof for direct attachment to said broad surface of like charge of said bipolar electrode.

20. The electrode of claim 16 wherein said planar support plate comprises a composite structure, said composite structure comprising paired, parallel metal foil sheets and a non-conductive separator located therebetween, wherein said support plates reside in bonded contact with each other along the perimeters thereof and said electrode is characterized by increased life in operation within said battery.

21. The electrode of claim 20 wherein said non-conductive separator comprises a double-surfaced plastic tape.

22. The electrode of claim 20 wherein said non-conductive separator comprises an insulative coating applied to at least one of the contiguous surfaces of said foil sheets.

23. The electrode of claim 20 wherein said metal foil sheets are prepared from lead.

* * * * *